(12) United States Patent
Alsobrook et al.

(10) Patent No.: US 7,657,919 B2
(45) Date of Patent: Feb. 2, 2010

(54) SINGLE WIRE RETURN DEVICE INCLUDING A QAM MODULATOR FOR DOWNSTREAM IP SIGNALS

(75) Inventors: David B. Alsobrook, Lawrenceville, GA (US); William E. Wall, Atlanta, GA (US); William C. Versteeg, Alpharetta, GA (US); Ajith N. Nair, Lawrenceville, GA (US)

(73) Assignee: Scientific—Atlanta, LLC, Lawrenceville, GA (US)

( * ) Notice: Subject to any disclaimer, the term of this patent is extended or adjusted under 35 U.S.C. 154(b) by 744 days.

(21) Appl. No.: 10/821,476

(22) Filed: Apr. 9, 2004

(65) Prior Publication Data

US 2004/0257976 A1 Dec. 23, 2004

Related U.S. Application Data

(63) Continuation-in-part of application No. 10/671,151, filed on Sep. 25, 2003, now Pat. No. 7,596,801.

(60) Provisional application No. 60/441,462, filed on Jan. 21, 2003.

(51) Int. Cl.
*H04N 7/173* (2006.01)
(52) U.S. Cl. ............... 725/129; 370/419; 725/127; 398/67
(58) Field of Classification Search ............ 398/67, 398/70, 71; 725/62, 109, 129, 80, 105, 111, 725/113, 127, 128; 370/94.1, 94.2, 419, 370/206
See application file for complete search history.

(56) References Cited

U.S. PATENT DOCUMENTS

| | | | | |
|---|---|---|---|---|
| 4,686,564 | A | | 8/1987 | Masuko et al. ............... 358/86 |
| 5,481,542 | A | * | 1/1996 | Logston et al. ............ 725/131 |
| 5,969,836 | A | * | 10/1999 | Foltzer ....................... 398/72 |
| 6,212,563 | B1 | * | 4/2001 | Beser ........................ 709/227 |
| 7,184,664 | B2 | * | 2/2007 | Farmer et al. ................ 398/72 |
| 7,190,901 | B2 | * | 3/2007 | Farmer et al. ................ 398/67 |
| 7,190,903 | B1 | * | 3/2007 | Combs et al. ................ 398/71 |
| 2002/0063924 | A1 | * | 5/2002 | Kimbrough et al. ......... 359/125 |
| 2002/0089725 | A1 | * | 7/2002 | Farmer et al. ............... 359/167 |
| 2002/0147978 | A1 | * | 10/2002 | Dolgonos et al. ............ 725/62 |
| 2004/0133907 | A1 | * | 7/2004 | Rodriguez et al. ........... 725/14 |
| 2004/0257976 | A1 | * | 12/2004 | Alsobrook et al. .......... 370/206 |
| 2005/0044576 | A1 | * | 2/2005 | Wall et al. .................. 725/129 |
| 2007/0074240 | A1 | * | 3/2007 | Addington et al. .......... 725/25 |

FOREIGN PATENT DOCUMENTS

| | | |
|---|---|---|
| WO | WO 01/11808 | 2/2001 |
| WO | WO 02/41558 | 5/2002 |
| WO | WO 03/005612 | 1/2003 |

\* cited by examiner

*Primary Examiner*—Scott Beliveau
*Assistant Examiner*—Alan Luong
(74) *Attorney, Agent, or Firm*—Merchant & Gould

(57) ABSTRACT

Systems and methods are disclosed for receiving IP video and audio signals at a subscriber's premises. A QAM modulator then modulates the IP signals and provides the modulated signals to a conventional digital home communications terminal (DHCT). Accordingly, conventional DHCTs can be used in an IP-based network.

7 Claims, 5 Drawing Sheets

SINGLE WIRE RETURN DEVICE INCLUDING A QAM MODULATOR FOR DOWNSTREAM IP SIGNALS

CROSS-REFERENCE TO RELATED PATENT APPLICATIONS

The present application is a continuation-in-part of U.S. patent application Ser. No. 10/671,151, filed on Sep. 25, 2003, now U.S. Pat. No. 7,596,801 which claims priority to U.S. provisional application Ser. No. 60/441,462, filed on Jan. 21, 2003.

FIELD OF THE INVENTION

This invention relates in general to broadband communications systems, and more particularly, to a fiber-to-the-home system and a networked multimedia system.

DESCRIPTION OF THE RELATED ART

Conventionally, broadband communications systems, such as cable television systems, provide cable television signals and related services including interactive media, telephony signals over a hybrid fiber/coax system. FIG. 1 illustrates a conventional broadband communications system for transmitting forward and reverse audio/video and data signals. In a digital broadband delivery system (DBDS) 105, signals including video, audio, voice, and data are transmitted and received. More specifically, a digital network control system (DNCS) 110 transmits and receives control signals from a plurality of digital home communications terminals (DHCTs) 145 installed in the system. The control signals are modulated by quaternary phase shift keying (QPSK) downstream modulators 115. In the downstream path, or forward path, QAM modulators 112 transmit and receive video and audio signals to the plurality of DHCTs 145. It will be appreciated that though only one QAM and QPSK modulator 112, 115 is shown, there are typically many modulators in the DBDS 105. The signals are typically converted into optical signals and transported over a fiber medium 120 to a node 125. The node 125, in a known manner, converts the optical signals into radio frequency (RF) signals for further transmission over coaxial cable 130. Taps 135, or splitters, split the signal and transmit the split signal to a plurality of subscriber premises 140. It will be appreciated that each premises 140 can include a plurality of DHCTs 145. Each DHCT 145 then receives the forward signals, which is either broadcast to several DHCTs 145 or transmitted to a specific DHCT 145, and an internal QAM demodulator 150 demodulates the signal in order to provide an appropriate format for viewing and hearing the signals.

In the upstream path, or reverse path, reverse signals (e.g., data or control signals) originating in the DHCT 145 are modulated with a QPSK modulator 155 and transmitted upstream to a QPSK demodulator 160(a-n) located in DBDS 105. Several demodulators (e.g., eight demodulators) are col-located with and each directly coupled to the QPSK downstream modulator 115 via a cable. If a DHCT 145 sends a reverse control signal that requests return signals, the appropriate downstream modulator 112, 115 that is associated with the sending DHCT 145 responds due to a direct coupling between a DHCT 145, a demodulator 160, and a modulator 115.

FIG. 2 illustrates an example of a fiber-to-the-home (FTTH) system 200. As products and technology evolved, the coaxial cable 130 was replaced with fiber cable 210 that runs directly to the premises 215. A DBDS 205, which can be operated by a broadband video operator, delivers telephone, audio/video, and data signals over fiber cable 210 to the premises 215. A fiber splitter 220 may be used to route fiber cable 210 to a plurality of premises 215. An optical network terminal (ONT) 225 receives the signals and provides the signals to a plurality of output ports depending upon the type of signal. For example, one port may be used for telephone service (POTS); another port may deliver audio/video signals over coaxial cable to a DHCT 230; and a further port may be used to route Ethernet, or data, signals to computers.

In the DBDS 205, the QAM downstream modulator 112 provides audio/video signals, which are typically radio frequency (RF) signals to an optical network 235. The optical network 235 converts the RF signals into optical signals for transport through the system. An Internet protocol (IP) network 245 receives any Internet signals from connected equipment and routes them to the optical network 235 for transport through the network.

Despite the advantages of running fiber to an ONT 225 in the forward path, there are some problems that need to be overcome in the migration from an RF hybrid fiber/coax system to an FTTH system. For example, it would be advantageous to transmit all signals, including video, voice, and data, in an IP-based delivery system. Conventional cable DHCTs, however, are not capable of receiving IP or Ethernet signals delivered over some home networking technology. Therefore, an IP-based delivery system would require an operator to replace or modify the conventional cable set-tops with an upgraded version that is capable of receiving IP signals. It is also possible to work around this set-top weakness by running an Ethernet cable 240 from each DHCT 230, which has an Ethernet connector, to the ONT 225, thereby making the set-top capable of receiving and sending Ethernet signals rather than RF signals. Unfortunately, however, supplying DHCTs 230 with Ethernet connectors and running Ethernet cable from each DHCT 230 to the ONT 225, is also extremely costly and laborious. What is needed, therefore, is a method and apparatus that allows the conventional cable DHCT 230 to receive video signals transmitted over IP in a FTTH system 200 over existing coaxial in the home.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, or data signals, to name but a few. Additionally, other methods of receiving RF modulated signals by the DHCT may be wireless, HPNA, or Homeplug, to name but a few. It will be appreciated that the DHCTs can operate independently, act as a server device in a networked system, or operate as remote devices in the network. All examples given herein, therefore, are intended to be non-limiting and are provided in order to help clarify the description of the invention.

The present invention is directed towards a device that efficiently receives and transmits IP signals in a FTTH system. More specifically, a QAM modulator located at a subscriber premises receives IP signals from an ONT and provides modulated signals to at least one cable DHCT. The QAM modulator is a data conversion device that receives Internet protocol (IP) signals, for example, IP switched digital and services such as video-on-demand, and provides an RF program to conventional cable DHCTs. Advantageously, hardware changes to the ONT, traditional household wiring, and cable DHCTs are not necessary in order to implement the present invention.

Figure 3:
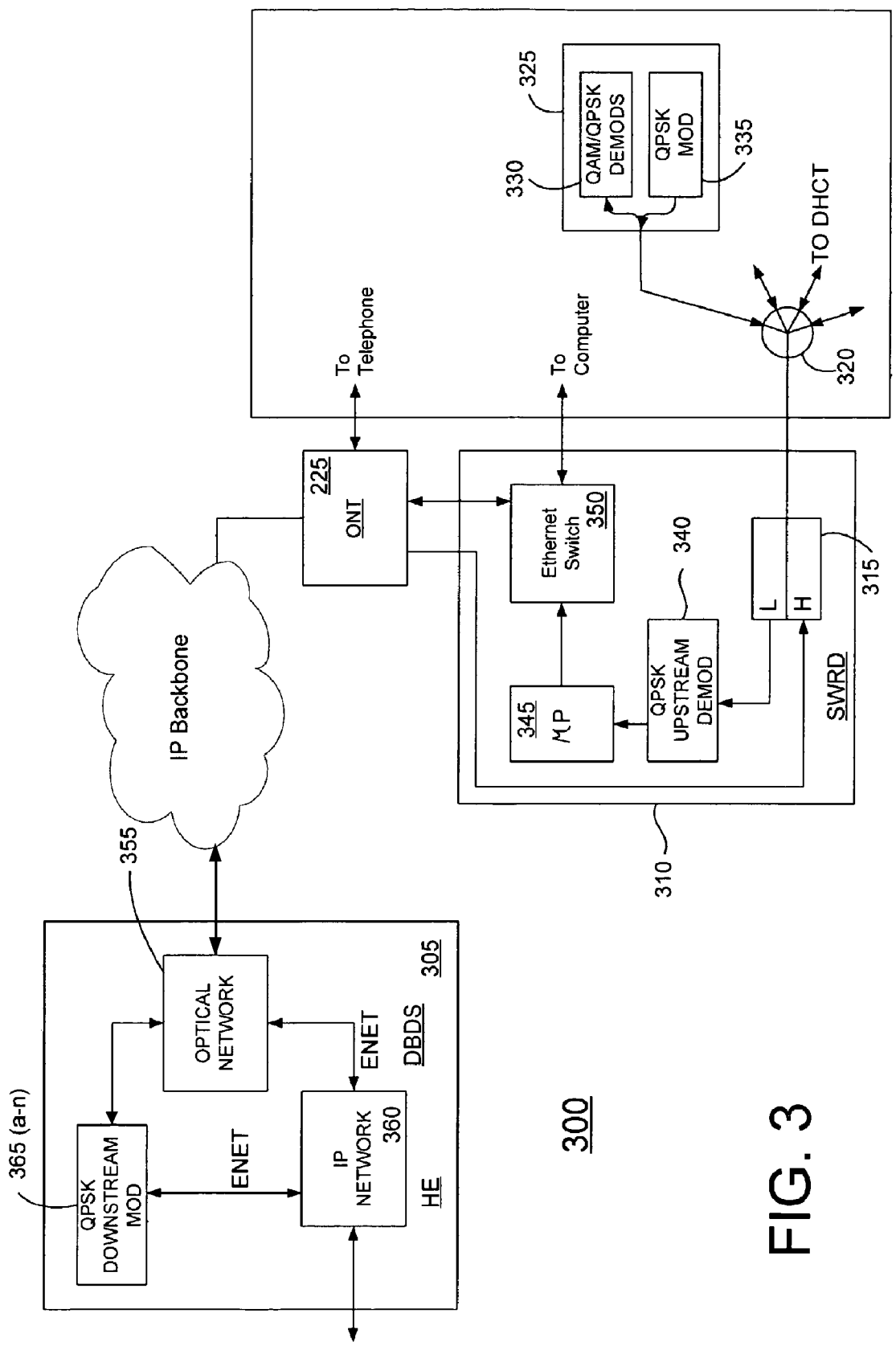
FIG. 3 illustrates the single wire return device in accordance with the present invention in an FTTH system.

FIG. 3 illustrates a single wire return device (SWRD) 310 that is suitable for use in an FTTH system 300. In the forward path, the ONT 225 continues to receive optical signals provided by a DBDS 305 via an IP backbone. Telephone signals are provided directly to connected telephones in a known manner. Ethernet signals and audio/video signals, however, are provided to the SWRD 310. An Ethernet switch 350, included in the SWRD, is coupled to the ONT 225 that receives and provides Ethernet signals to a computer. Audio/video signals (i.e., RF signals) are provided to a diplex filter 315, where a highpass filter isolates the forward signals, which are typically provided in the range from 45 MHz to 870 MHz. The diplex filter 315 may be coupled to a splitter 320, for example, that then splits the forward signal for transmission to a plurality of DHCTs 325. A QAM demodulator 330 demodulates the forward signals for subsequent processing.

Figure 1:
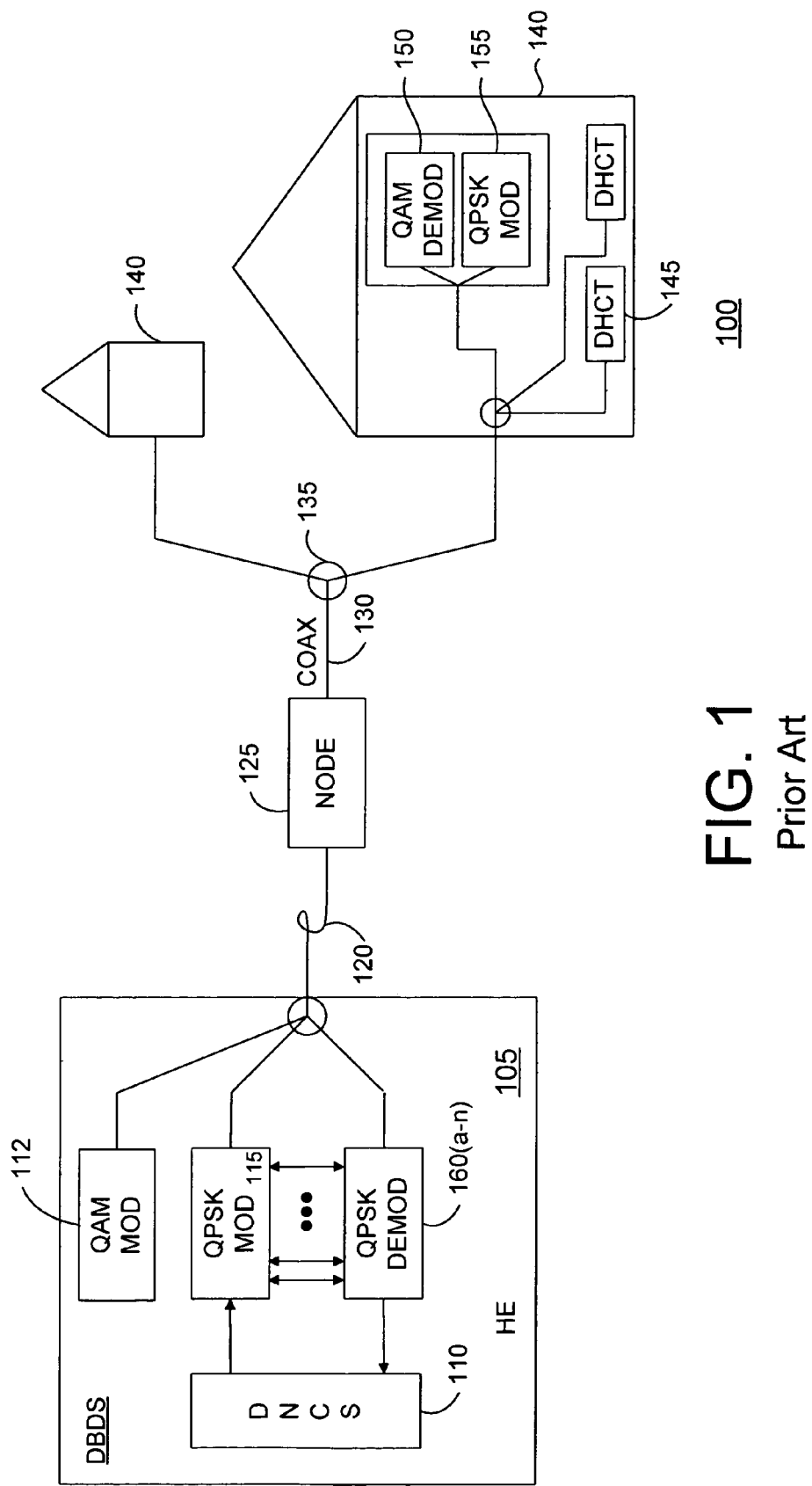
FIG. 1 illustrates a conventional broadband communications system for transmitting video and audio signals.
Figure 2:
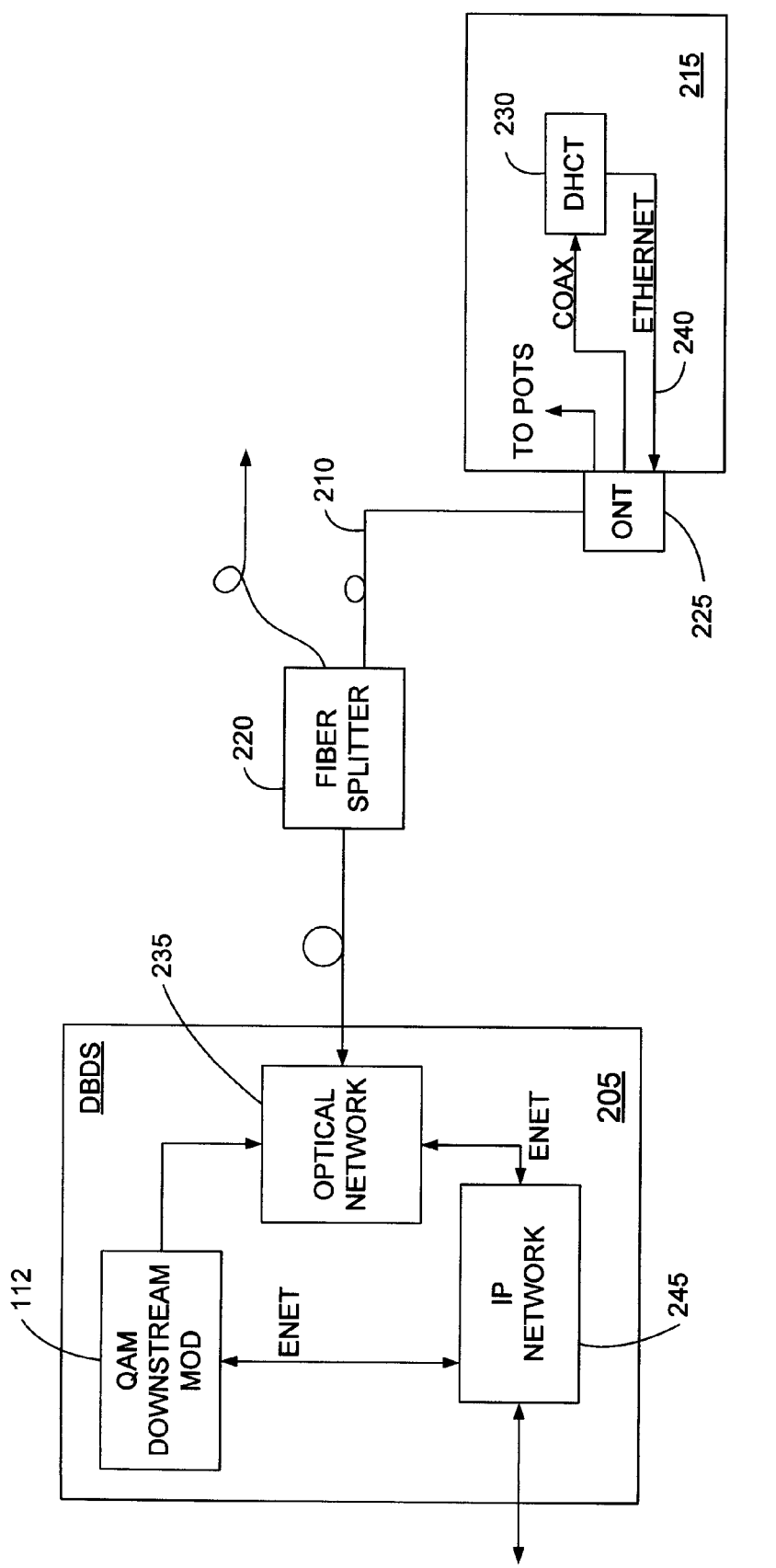
FIG. 2 illustrates an example of a fiber-to-the-home (FTTH) system.

In the reverse path, the DHCTs 325 modulate the reverse signals via a QPSK modulator 335. The modulated RF signals are transmitted from the common forward-reverse coaxial port instead of transmitting reverse Ethernet signals via the Ethernet port as illustrated in FIG. 2. If necessary, the splitter 320 combines the signals from the plurality of DHCTs 325. The reverse signals are provided to the diplex filter 315 and isolated by a low pass filter since reverse signals are typically provided in the range from 5 MHz to 40 MHz. The isolated reverse signals are subsequently provided to a QPSK upstream demodulator 340 for demodulation. A microprocessor 345 then converts the demodulated signals into Ethernet signals. The Ethernet switch 350 then receives the Ethernet signals and combines the reverse signals with other reverse signals, such as signals from the computer located in the premises. The combined signals are subsequently provided to the ONT 225 for conversion to optical signals and transmission over the fiber network.

At the DBDS 305, an optical network 355 receives the reverse optical signals and, via an Internet Protocol network 360, provides the signals either to a QPSK downstream modulator 365, a QAM modulator (not shown) or other processing equipment (not shown). In the event the reverse signals are control messages, such as power calibration of the DHCT 325 or DAVIC sign-on messaging, the QPSK downstream modulator 365 receives the control signals via the DNCS (not shown). The QPSK downstream modulator 365 modulates the signals and responds accordingly via the optical network 355.

As mentioned, there are a plurality of downstream modulators 365a-n that typically serve different areas of the system where each area has different multiple upstream demodulators 340. Conventionally, the upstream demodulators 340 were collocated, so there was no problem in identifying which downstream modulator 365a-n needed to respond. In the present invention, however, the downstream modulator 365 is not directly coupled to the upstream demodulator 340, thereby requiring identification of an associated modulator 365a-n.

A preferred embodiment of the present invention utilizes fields in header information and inserts the modulator 365a-n address at the DHCT 325. It will be appreciated that header information attaches to the data packets for several reasons, such as identifying the packets or identifying a specific DHCT 325, to name a couple reasons. Accordingly, in addition to the existing header information, the DHCT 325 adds its associated modulator address to the header information in accordance with the present invention. A DHCT 325 receives its associated downstream modulator 365a-n address, or identification number, at some time and stores that address in memory. The modulator 365a-n identification is then mapped or converted into an IP address prior to transmission by the SWRD 310.

Figure 4:
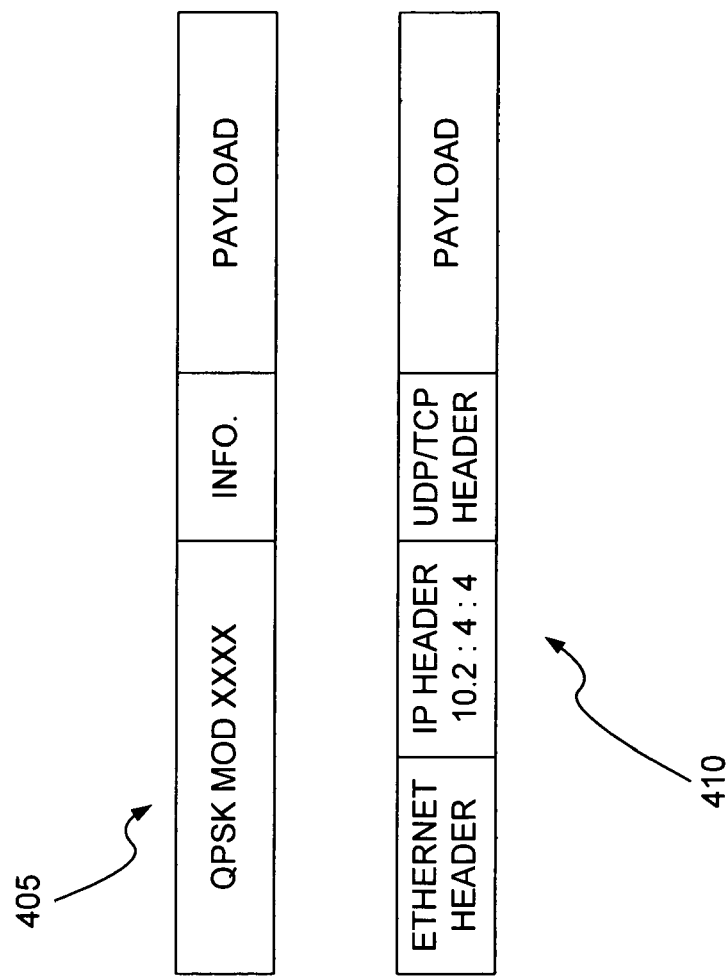
FIG. 4 illustrates an example of a downstream modulator address including additional header information and the payload data that is converted into an IP address.

FIG. 4 illustrates an example of a downstream modulator address 405 including additional header information and the payload data that is converted into the IP address 410. When the DHCT 325 sends a reverse signal, the microprocessor 345 in the SWRD 310 converts the downstream modulator address 405 into an IP address 410. The microprocessor in the SWRD 310 can use the standard 'gethostbyname' to map the modulator ID (identification) into an IP address. The underlying network layer may use various methods to convert the modulator ID into an IP address. These methods include a local table loaded into the SWRD 310 or a Domain Name System (DNS) query.

Figure 5:
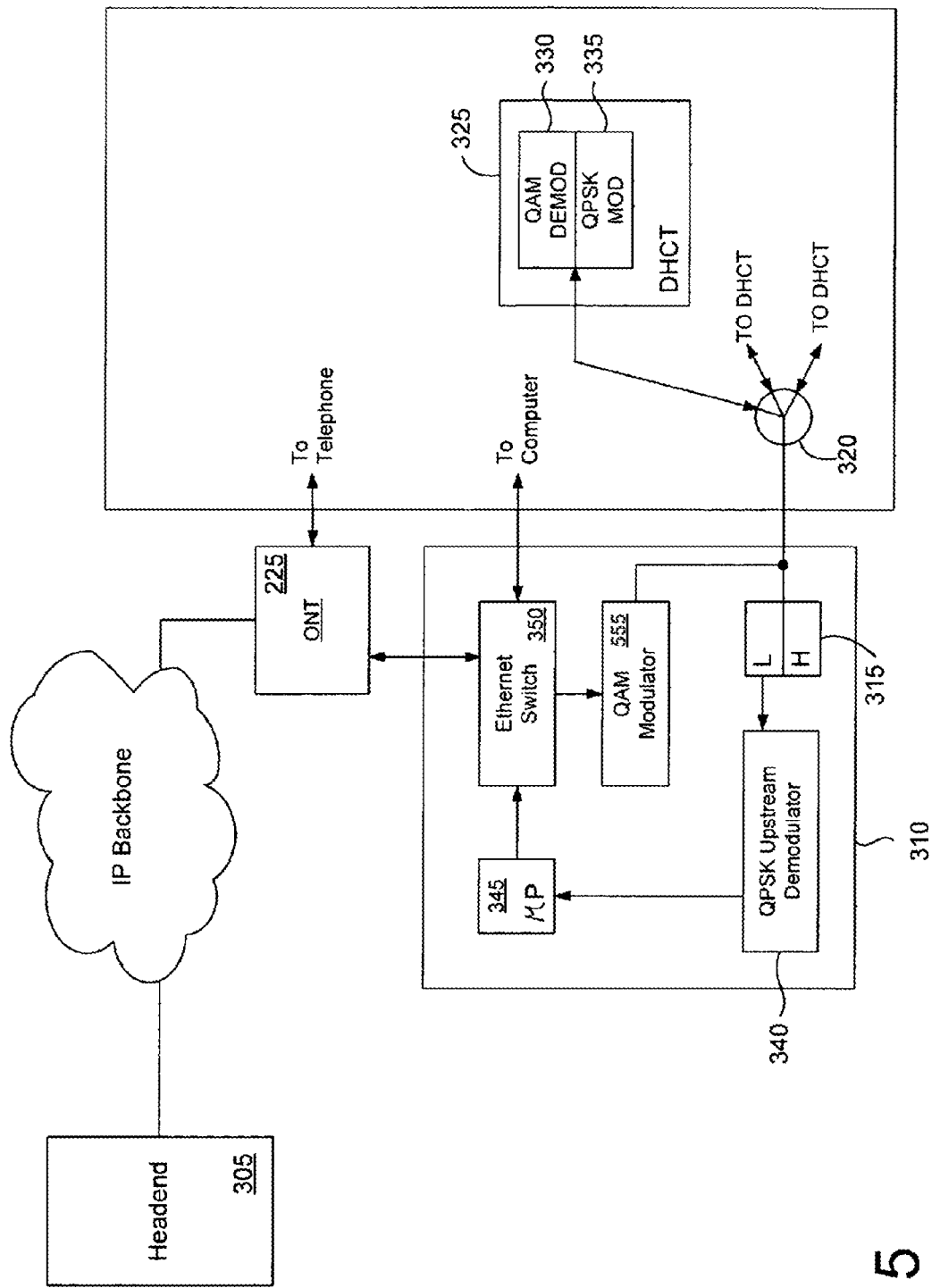
FIG. 5 illustrates the single wire return device including a QAM modulator in accordance with the present invention in an FTTH system.

FIG. 5 illustrates the single wire return device 310 including a QAM modulator in accordance with the present invention that is suitable for use in an FTTH system 300. As mentioned, in the forward path, the ONT 225 receives IP optical signals provided by the provider, i.e., headend facility 305. Telephone signals received by the ONT 225 are provided directly to connected telephones in a known manner. Ethernet signals and audio/video signals, however, are provided to the SWRD 310. The Ethernet switch 350 coupled to the ONT 225 receives and provides Ethernet, or IP, signals to a computer as the signal label header demands.

In an IP-based network that uses conventional cable DHCTs, targeted video and audio signals, which are digital IP signals, are also provided to the Ethernet Switch 350. Using the label information included in a header of the IP signals, the Ethernet switch 350 provides the video and audio signals to QAM modulator 555. The QAM modulator 555 modulates the IP signals using, for example, a 256 QAM constellation signal. The QAM modulated signals is then provided to splitter 320 for distribution to connected DHCT(s) 325. The QAM demodulator 330, which exists in conventional DHCTs, demodulates the signal to provide an appropriate signal response for viewing. A preferred embodiment of the present invention utilizes fields in the header information to insert the QAM modulator address at the provider facility 305. A control server then located in the provider facility 305 provisions a targeted QAM modulator 555 to receive a session, or program.

Accordingly, a system and device has been presented that efficiently transmits IP switched digital and targeted signals (e.g., VOD signals) from a DBDS 305 to a plurality of DHCTs 325 by QAM modulating the IP signals at a subscriber's premises. Importantly, the requirement for Ethernet cabling between a conventional cable DHCT 325 to the ONT 225 has been eliminated. It will be appreciated, however, that related embodiments could be implemented without departing from the scope of the present invention. For example, a different modulation format can be used rather than QAM modulation. The following claims are intended to capture the invention in light of the detailed information above.

What is claimed is:

1. A fiber-to-the-home (FTTH) system for transmitting and receiving IP signals, the FTTH system including a headend facility in communication with a plurality of subscriber premises, each subscriber premises comprising:
   an optical network terminal (ONT) for receiving downstream and upstream IP signals and for routing the IP signals to a coupled device or the FTTH system;
   a receiving device for receiving downstream IP signals from the optical network terminal and for providing upstream IP signals to the optical network terminal, the receiving device comprising:
      an Ethernet switch for routing downstream IP signals: and
      a modulator for receiving downstream IP video and audio signals from the Ethernet switch, the modulator for modulating the IP video and audio signals to provide RF signals;
   at least one digital home communications terminal (DHCT) for receiving the RF signals from the modulator; and
   the FTTH system further comprising a reverse path, comprising:
      the at least one DHCT for transmitting reverse RF signals, the reverse RF signals including header information and payload data;
      the receiving device for receiving the reverse RF signals, demodulating the reverse RF signals, and converting the demodulated signals to Ethernet signals;
      the ONT for converting the Ethernet signals to optical signals, and for transmitting the optical signals to the headend facility via optical fiber; and
      a downstream modulator located in the headend facility for receiving signals corresponding to the optical signals and for sending the forward signals downstream to the at least one DHCT via the ONT, the downstream modulator having an identification number that is inserted into the forward signals,
      wherein the at least one DHCT inserts the received modulator identification number in the reverse header information, and wherein the receiving device converts the modulator identification number into an Internet Protocol address indicative of the modulator identification number.

2. The FTTH system of claim 1, wherein the receiving device for providing IP data signals to a computer via a computer address.

3. The FTTH system of claim 1, wherein the optical network terminal for providing IP telephone signals to a coupled telephone.

4. The FTTH system of claim 1, the receiving device further comprising:
   an upstream demodulator coupled to a diplex filter for demodulating the reverse RF signals;
   a microprocessor for converting the demodulated signals into the Ethernet signals and for providing the Ethernet signals to the switch; and
   the switch for receiving the Ethernet signals and any additional signals from a second source, the switch for combining the signals and for providing a combined signal to the ONT.

5. The FTTH system of claim 4, wherein the receiving device converts the identification number into the Internet Protocol number via the microprocessor.

6. The FTTH system of claim 1, wherein the modulator modulates the IP video and audio signals with quadrature amplitude modulation (QAM).

7. A fiber-to-the-home (FTTH) system for transmitting and receiving IP signals, the FTTH system including a headend facility in communication with a plurality of subscriber premises, each subscriber premises comprising:
   an optical network terminal (ONT) configured to receive downstream and upstream IP signals and route the IP signals to a coupled device or the FTTH system;
   a receiving device configured to receive downstream IP signals from the ONT, provide RF signals, and provide upstream IP signals to the ONT, the receiving device comprising an Ethernet switch configured to route downstream IP signals;
   at least one digital home communications terminal (DHCT) configured to receive the RF signals from the receiving device, the at least one DHCT configured to transmit reverse RF signals, wherein the reverse RF signals include header information and payload data;
   the receiving device is further configured to receive the reverse RF signals, demodulating the reverse RF signals, and convert the demodulated signals to Ethernet signals;
   the ONT is further configured to convert the Ethernet signals to optical signals, and transmit the optical signals to a headend optical network located in the headend facility via optical fiber;
   wherein the at least one DHCT inserts a received modulator identification number in the reverse header information, and wherein the receiving device converts the modulator identification number into an Internet Protocol address indicative of the modulator identification number; and
   the FFTH system further comprising a downstream modulator located in the headend facility configured to receive signals corresponding to the optical signals from the headend optical network and to send forward signals corresponding to the IP downstream signals, the downstream modulator including the modulator identification number which is inserted into the forward signals.

* * * * *

UNITED STATES PATENT AND TRADEMARK OFFICE
CERTIFICATE OF CORRECTION

PATENT NO. : 7,657,919 B2
APPLICATION NO. : 10/821476
DATED : February 2, 2010
INVENTOR(S) : Alsobrook et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1412 days.

Signed and Sealed this

Twenty-eighth Day of December, 2010

David J. Kappos
*Director of the United States Patent and Trademark Office*